(12) United States Patent
Aviña

(10) Patent No.: US 6,451,091 B1
(45) Date of Patent: Sep. 17, 2002

(54) APPARATUS AND METHOD FOR EMISSIONS CONTROL THROUGH CONTINUOUS FILTRATION SYSTEM

(76) Inventor: David Christopher Aviña, 111 Sycamore St., Bay St. Louis, MS (US) 39520

( * ) Notice: Subject to any disclaimer, the term of this patent is extended or adjusted under 35 U.S.C. 154(b) by 0 days.

(21) Appl. No.: 10/066,240

(22) Filed: Feb. 5, 2002

(51) Int. Cl.[7] .......................... B01D 46/04; B01D 53/04
(52) U.S. Cl. ........................ 95/107; 95/280; 95/285; 96/138; 96/154; 55/341.1
(58) Field of Search .................... 95/90, 107, 276, 95/278–282, 285, 286; 96/138, 151, 154; 55/286, 341.1

(56) References Cited

U.S. PATENT DOCUMENTS

| | | | | |
|---|---|---|---|---|
| 3,375,641 A | * | 4/1968 | Labbe ........................ | 55/293 |
| 3,388,534 A | * | 6/1968 | Jensen ...................... | 55/282.5 |
| 3,699,747 A | * | 10/1972 | Kroll ......................... | 55/302 |
| 3,969,482 A | * | 7/1976 | Teller ....................... | 423/215.5 |
| 4,010,013 A | * | 3/1977 | Murayama ................. | 55/286 |
| 4,046,526 A | * | 9/1977 | Phillippi ..................... | 55/288 |
| 4,260,399 A | * | 4/1981 | Kawasaki ................... | 55/286 |
| 5,178,652 A | * | 1/1993 | Huttlin ....................... | 55/302 |
| 5,387,406 A | * | 2/1995 | Ruoff ......................... | 422/177 |
| 5,405,421 A | * | 4/1995 | Swisher, Jr. ................ | 55/284 |
| 5,505,766 A | * | 4/1996 | Chang ........................ | 95/134 |
| 5,948,127 A | * | 9/1999 | Minakawa et al. .......... | 55/283 |

FOREIGN PATENT DOCUMENTS

| | | | |
|---|---|---|---|
| GB | 1501866 A | * | 2/1978 |
| JP | 54-156274 A | * | 12/1979 |

OTHER PUBLICATIONS

Steinke et al, United States Patent Application (US2002/0007731 A1), published Jan. 24, 2002.*

* cited by examiner

Primary Examiner—David A. Simmons
Assistant Examiner—Frank M. Lawrence

(57) ABSTRACT

A method of improving the removal of particulate matter, heavy metals, and acidic gases in waste gas emission streams through continuous filter control through the utilization of independent chambers to divert the flow of waste gas during the cleaning and precoating cycles of the chamber to optimize emission collection efficiency and prevent fugitive emissions.

9 Claims, 4 Drawing Sheets

APPARATUS AND METHOD FOR EMISSIONS CONTROL THROUGH CONTINUOUS FILTRATION SYSTEM

SUMMARY OF INVENTION

This instant invention is concerned with the elimination of polluting constituents from gaseous combustion products, e.g., flue gases. The invention is particularly directed toward the elimination of fugitive emission associated with the art of dry emissions filtration pollution control systems, a characteristic features of this invention is a method of continuous pollutant emissions filtration.

The problems of air pollution, resulting from the venting of combustion gases, is recognized as an interest of current research as dictated by the U.S. Environmental Protection Agency to improve the emission control of utilities and industrial operations. Among techniques used to separate fly ash and other pollutants from flue gases are a variety of gas filters, dynamic air-solids separators, wet scrubber, and electrostatic precipitators, although effective to a degree, substantial improvement is possible in the art of dry filtration techniques. There has been special regard to recovery efficiencies for particulate matter, heavy metals, and organic compounds associated with combustion emissions from coal fired power plants, incinerators of biomedical waste, and municipal wastes incinerators. Presently, dry process are approximately 65 to 85 percent effective in recovery of pollutant emission gases.

This invention improves the upon this dry process known as dry filtration emissions control that utilizes filter media in one or more divided chambers commonly termed a bag house chamber. This chamber is divided into three segmented areas e.g., bottom ash hopper, lower treating chamber, and upper treated chamber. A filter media exists between the upper and lower chambers separating a manifold waste gas inlet line fitted with a control valve to control the flow of the waste gas, and a manifold treated gas outlet.

Waste gas being processed is presently passed through a wet or dry injection chamber where different methods are used to improve absorption of gaseous pollutants in the gases passage from the injection point and the control chamber where pollutants are to a great extent captured by the filter media. This injection process has been shown to improve capture efficiency on an increased basis as ash and sorbent materials form on the surface of the filter media. As improved collection is key to the efficient to the operation of these systems, it is known that the efficiency of these injection systems is dependent upon the capture rate of the filter membrane on which these absorbing particles impinge and are ultimately captured in order to provide efficient recovery. It is known in present technology a method of cleaning the filer media that allows waste gas to pass through the filter media unaided by a collected sorbent layer. It is also known, that filter media operates most efficiently when a porous sorbent coating is accentual to provide protection from abrasion and chemical attack of the filter media, and also improves the filter media'ability to capture particles below 20 micron. It is also known in the art that sorbent applied to a filter media substrate is highly efficient in the removal of gaseous emissions to a very effective degree.

Current best available control technology or (BACT) is utilized in the cycle operations of filter chambers. These process provided in prior art uses on line and off line cleaning methods to eliminated capture pollutants and sorbent material from the treating chamber. In the case of "Off Line" cleaning the flow of waste gas to a treating chamber is terminated, and vibration or reverse air supply under pressure is used to remove these pollutants and sorbent coating from the surface of the filter media membrane separating the treated and untreated chambers. Once removal has been completed the chamber is cycled into an "On Line" operation allowing the waste gas to flow through the filter media membrane at a reduced efficiency to capture pollutant gases due to the lack of a coating established on surface of the filter media. The other method in the art is commonly known as "On Line" cleaning. This method is the preferred method of practice. In this method waste gas is not terminated during cleaning and continually flows while individual filter media segments are cleaned by the employment of backpressure valves that isolates the filter media from the exhaust manifold allowing compressed gases (air) to flow in a reverse flow fashion to release the coating from the surface of the filter media as described above once completed backpressure valves are reopened. It is also known that this method is problematic because when the filter segment is cleaned the waste gas flow through the uncoated filter media increases and permits more pollutants on a volume metric basis to pass untreated into the manifold treated exhaust chamber than from a coated filter. It is known that this increase in flow is caused by a corresponding decrease in flow resistance attributed to the coating residue accumulated upon the filter media substrate. In effect the coating is part of the filter mechanism. As such this instant invention is an apparatus that observes this coating as an essential component and maintains this coating through the waste processing cycle of the invention.

The Best Available Control Technology as defined by the U.S. Environmental Protection Agency (EPA) is therefore improved by this invention. The dry filtration process system is most frequently used to provide maximum control in the removal of harmful toxic emissions from entering the environment is therefore advanced.

The principal object of the instant invention is to promote progress in the aforementioned desiderata of the art and to provide a flue gas treatment process which is both economical of operation and potentially capable of producing returns on investment in the form of useful, reductions in waste, and sorbent usage. Especially, it is an object of this invention to provide a treatment readily adaptable to existing combustion facilities that provided full and uninterrupted control of pollutant emissions.

In accordance with the present invention, flue gases are typically passed through single or multiple filters constructed of a suitable porous material e.g., (cloth, metal, polymer composite, or ceramic), said filters are arranged in a manner having a common inlet and a common outlet bisected by a division member isolating the treated and untreated chambers from each other. This invention improves this prior art by surrounding the said filters on four sides in such a manner to provide an enclosure from adjacent filter segments. The enclosure is fitted with automatically operated dampers or isolation doors on the inlet and outlet sides. This adaptations allows for the; purge, cleaning, and precoating of the filter segments outside of the presents of a waste gas stream in the chamber.

For the purpose of this invention a row of filters is isolated above and below by double acting dampers. This invention also provides an improvement of prior art systems by the addition a heated clean sorbent air supply system to each chamber provided below the filter media and above the lower process waste stream isolation dampers. This improvement on prior art allows filter segments within the main chamber to be removed from service by closing the upper isolation dampers isolated the waste gas stream e.g., (off line condition) and through vibration or reverse flow remove filter coating in a no flow state, allowing fly ash and spent sorbent to drop into the fly ash hopper. Once coatings have been removed the chamber is purged until waste gas and dust have been removed then the lower dampers are closed and the upper dampers are opened. At this point a separated sorbent supply conveyed by clean heated air is allowed to enter the chamber through a control valve. As the heated conveying air with an entrained sorbent passes through the chamber the activated sorbent is deposited upon the surface of the filter media, this continues until a pressure drop is across the filter media is detected greater than a clean filter media measures. As in prior art a differential pressure switch is used to obtain these measurements. Once a pressure drop of sufficient amount is obtained, developed by the build up of a sorbent coatings the lower isolation dampers are opened, allowing process gas to pass through the filter media processed by a dense reactive chemical media on the surface of the filter. This process is repeated each time a filter or number of filter requires cleaning or when the systems is placed on line on startup. This invention permits the continuous processing of waste gas in a manner that provides maximum exposure of process gas to chemical sorbent and prevents fugitive waste gas emission from bypassing sorbent exposure as is demonstrated in prior art systems that use waste gas as the sorbent transport method.

BACKGROUND OF THE INVENTION

The art of pollution control known as "dry" baghouse filtration is known to provide lower levels of efficiencies than "wet" process. This invention improves the dry filtration process to the same efficiencies as that established in wet process provided by a continuous mode of operation. It is known in the art that dry processes are not continuous in nature and are termed intermittent. It is also known that the dry process could operate at high levels of efficiency as that found in the wet process by resolving the intermittent behavior characteristic of the dry process. It is known that the intermittent processing during the processing cycle occurs after the cleaning of the filter media. Many prior art processes improve the intermittent behavior of these systems by injecting sorbent in the waste gas stream in the attempt to capture pollutants before by the sorbent prior to contact with the filter media. While this prior art practice improves the process, it is known that the most effective removal is obtained when the pollutants are in very close contact with a dense bed of sorbent material. It has been demonstrated that capture efficiency is a function of proximity. When chemicals or particulates are in close proximity with a sorbent supported on a substrate of filter media it is in this area that provides the most effective removal due to increased capture rates. Prior art process, while providing sorbent of different kinds and many forms of injection processes, do not address the intermittent cycle of a filter chamber or the root cause for reduced efficiency. It is known by the inventor that the root cause of the intermittent process is the use of waste gas as the source to transport sorbent to the filter media after the cleaning cycle has been complete. This invention improves this process by using a separate clean air stream to transport the sorbent to the filter media independent of the untreated process gas stream. This invention prevents polluted gases and particulates from escaping through uncoated filters and entering the atmosphere untreated by a sorbent.

Two useful benefits other than improved efficiency are obtained by the use of this invention's continuous process. It is known that sorbent chemicals are used in the operation of prior art systems, and that by increasing the volume of sorbent injected an improved pollutant removal is obtained. As increased restrictions in air quality are mandated by regulation, operators improve the efficiency of pollutant control systems by increasing the sorbent usage rates to obtain lower instantaneous pollution emission levels. As this invention provides a continuous process the use of sorbent is most often reduced and higher capture rates are experienced. As facility operators most often expect improved efficiency to cost more, the cost benefit of lower sorbent usage is welcomed. Another benefit of this process is a reduction of solid waste generated by excessive sorbent usage. The improved efficiency provided by this invention also provides additional productivity benefits. Lower sorbent usage translates into a reduction of transportation, and waste disposal cost.

In two tests preformed in 1992 at an operating incineration plant supervised by the Colorado Department of Air Quality this process improved the emissions control of a common baghouse filter from 62 percent to 99.9 percent and reduced sorbent usage by 35 percent.

DETAILED DESCRIPTION

Figure 1:
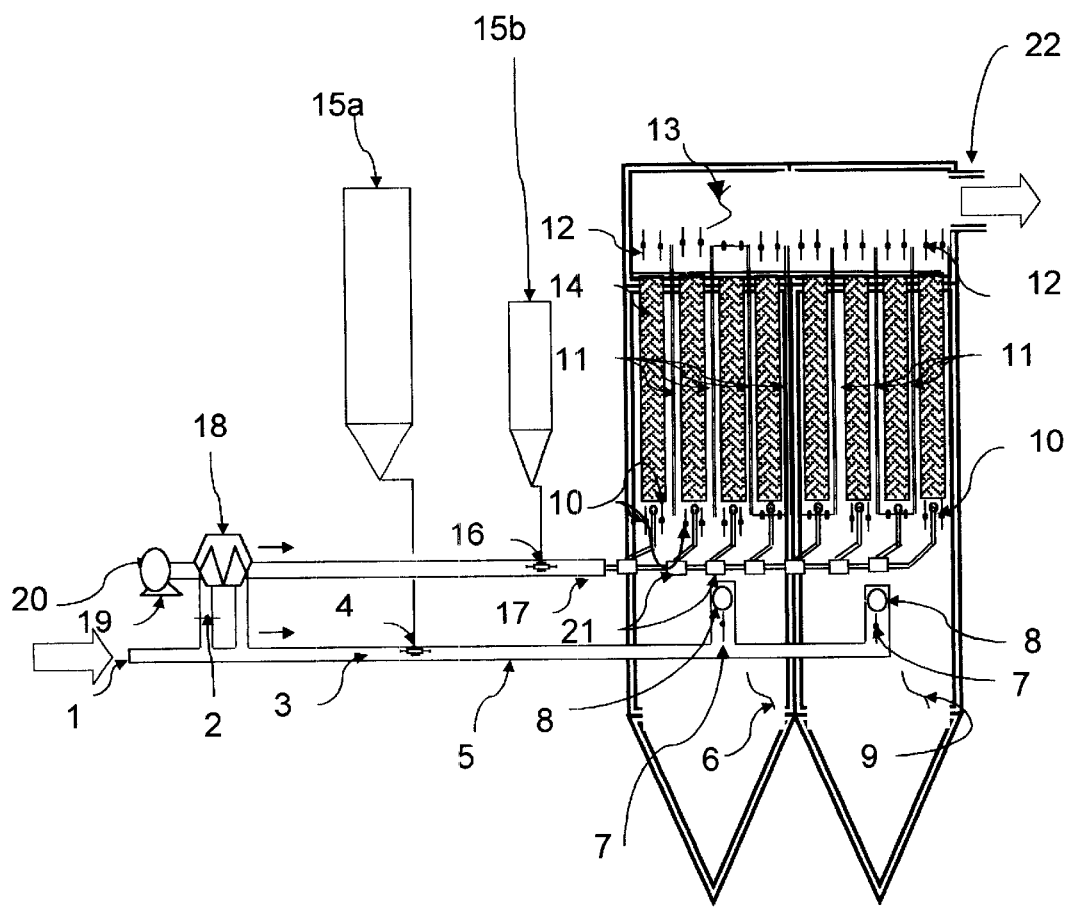
FIG. 1 is a schematic representation of one embodiment of a baghouse filtration system in accordance with the present invention.

The present invention will be described with reference to the accompanying drawings which assist in illustrating the pertinent features thereof. In this regard, the present invention improves upon the art of baghouse filtration systems in that it generally incorporates an apparatus to isolate single or groups of filters from the process stream for the cleaning and reapplication of sorbent with ambient air. This allows a formation of a sorbent precoat layer upon the filters known to increases the potential for removal of pollutant emissions to a very high degree. Furthermore this invention incorporates a dual sorbent supply in the ambient air stream or other relatively "clean" gas stream and subsequently to apply said sorbent to the selected filter or group of filters by the use of isolation dampers to enclose individual filters or sections of filters in controllable chamber(s) and preventing waste gas from entering thereto. FIG. 1. This is a cross section of the apparatus as applied as an improvement on a prior art system baghouse filtration system, containing a waste gas source 1, conveyed through ductwork 3, and injected with sorbent from 4, from silo 15a, to be conveyed by ductwork 5 to inlet port 8 and controlled by damper 7 into chamber 6, or 9 that are arranged below filter 14, surrounded by chambers 11. As chambers 11 have opposing inlet dampers 10, and outlet dampers 12, each chamber may be isolated after closing damper 12, and is known that a pulse of compressed air, or vibration can be used to clean a bags 14, and free spent sorbent, fly ash, and other collected pollutants attached to within the sorbent layer. Once a cleaning cycle is completed diverter valve 21 is partly opened to start a purge cycle while dampers 12 are close and dampers 10 are opened, allowing the upper part of chamber 11 to be come connect to the clean or treated manifold section 13 of the manifold outlet chamber. Isolated from the waste gas flow, diverter valve 21 is fully opened allowing clean air forced by fan 20, through heat exchanger 18, to pass through injector 16 supplied with sodium bicarbonate sorbent in hopper 15b to enter the chamber. This process continues until a sufficient amount of sorbent is deposited upon the surface of the filter media in sufficient quantity to provide a differential in pressure between the inlet and outlet sides of the filter media is obtained.

This process will entrain sorbent in clean air by injector 16 through ductwork 17 and channeled by diverter valve 21 into chamber 11, and the entrained sorbent is transported though the filter media capturing sorbent particles upon said filter media and a coating is thereby developed (not shown).

As the filter media is being cleaned waste gas is also allowed to pass through other similar fitted chambers and pass out through exhaust manifold 13 to exit through port 22, to an exhaust stack.

Figure 2:
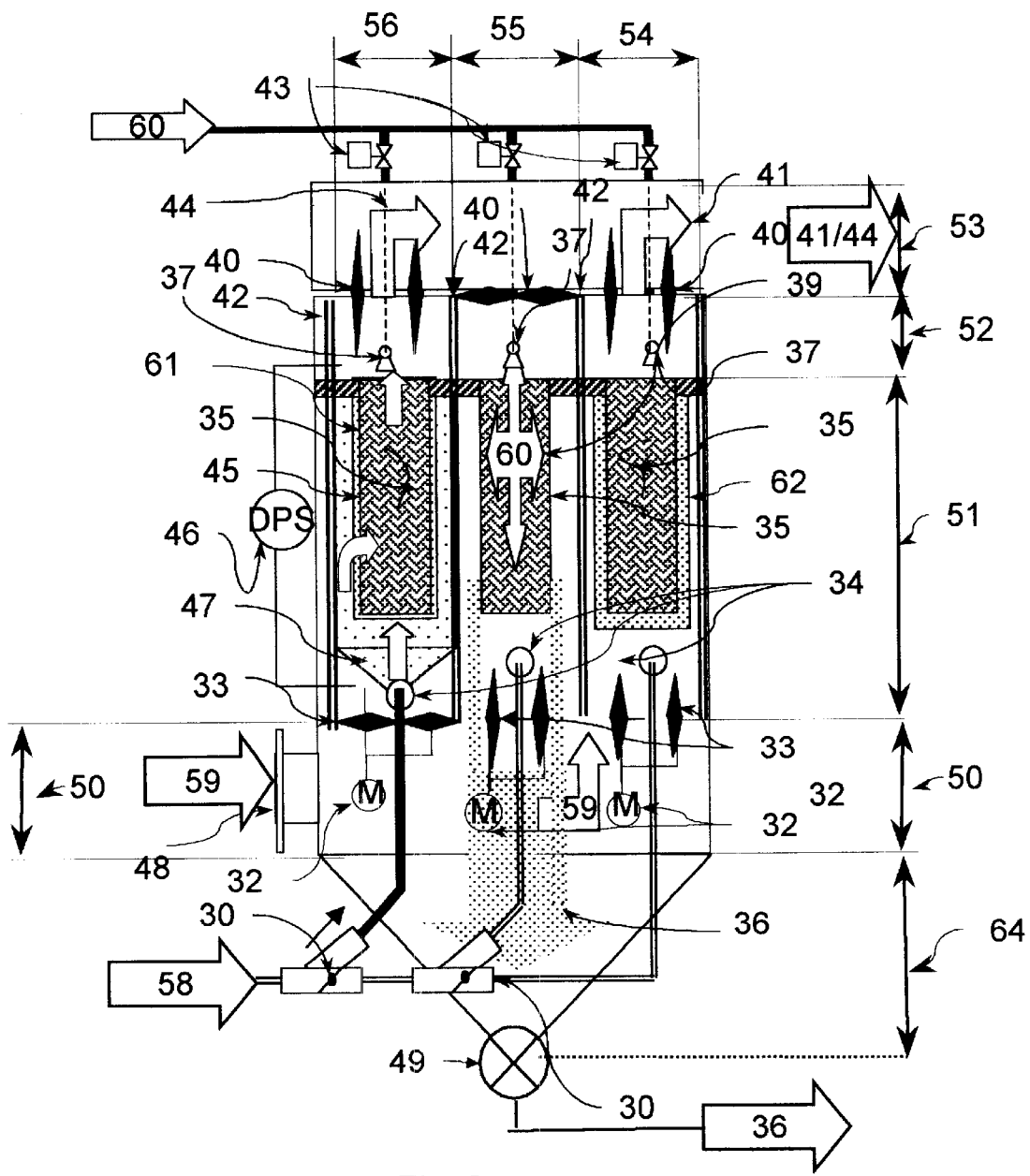
FIG. 2 is a flow diagram of the invention showing the three stages of operation isolation chambers and damper placement around the filter arrangement within the baghouse assembly during the three stages of operation.

FIG. 2. This illustration is the process flow diagram of the invention shown divided into areas 50, 51, 52, 53, 64 and include segments 54, 55, and 56. As is indicated in FIG. 1, waste gas moves through open dampers 33 at the bottom of chamber 51 of segment 54. This chamber has one or more filter media 35 that support sorbent coating 62 held on by positive pressure from the gas steam. As process gas 59 moves through the filter media and sorbent coating as shown collects a dense layer of sorbent known to remove particulate matter and pollutant gases chiefly fly ash, sulfur dioxide, Nitrogen Dioxide, Arsenic, Cadmium, Chromium, Lead, Mercury, Dioxins, and other products of combustion contained in the moving waste gas stream 59 when these pollutants are recovered through entrapment, the process gas stream 41, is cleaned to a very high degree from pollutants as it passes through area 52 through open damper 40 and into area 53 the treated gas manifold to release usually through a emission stack.

Segment 55 illustrates an off line process for cleaning of the filter media known to provide a back pressure of reverse air flow through the filter media. As dampers 40 is closed to provide isolation of upper part of the chamber area 52 effectively locking the chamber so back pressure can be created from high pressure air 60 introduced through nozzle 37 and controlled by valve 43. It is known that reverse air 39 against a closed chamber 52 will remove deposited solids 36 from surface of filter media 35, and drops by gravity into ash hopper segment 64 to be collected and conveyed through air lock 49 in to conveying line 36 for disposal.

A key disclosure of this invention is the construction indicated in segment 56. This illustrates an off line coating process in that, damper 33 of segment 56 is closed and damper 40 is open, this isolates polluted process gas 59 from entering section 51 while a supply of clean heated air 58 is introduced through heat exchanger (not shown) to maintain a temperature between 250 and 300° F. This heated clean air supply is injected with sodium bicarbonate sorbent shown in FIGS. 1–13, and passed through selection valve 30 to port 34 where sorbent 61 and conveying air 47 deposits a layer 45 upon the filter media 35. This layer is controlled by pressure switch 46 that closes when a set point is been reached indicating a complete layer of 1–2 mm upon the filter media surface. The clean air 44 free of sorbent material passes into area 52 through open damper 40 into area 53 for release to a emission stack along with treated process gas from section 54.

Figure 3:
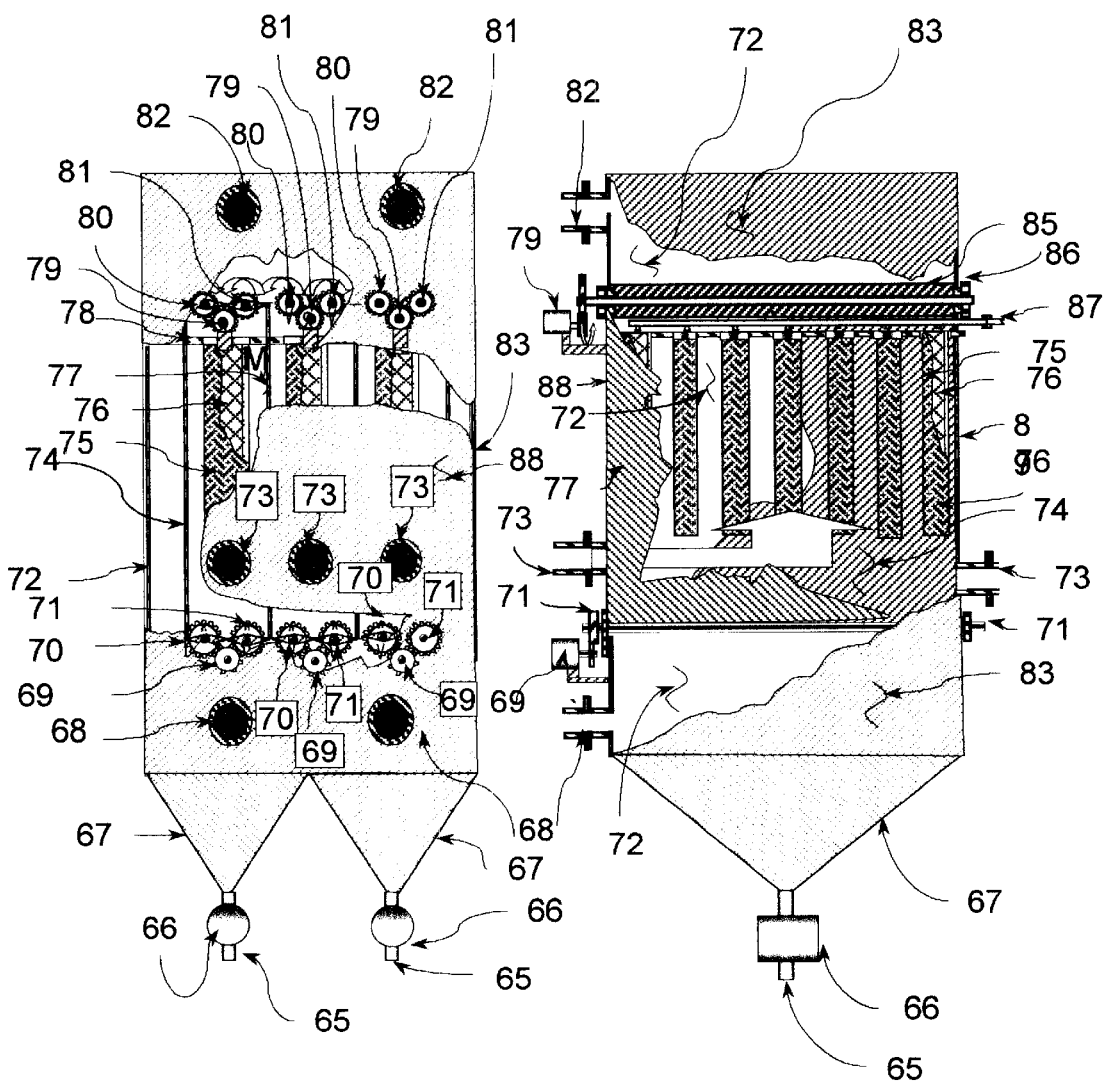
FIG. 3 is a cross-sectional view of the invention showing chamber arrangement and inlet and damper locations.

FIG. 3. Illustrates the body of the invention, in in views 3–1 that is a frontal elevation view of the invention, and 3–2 that is a side elevation view of the same enclosure. FIG. 3–2 shows a chamber made up of side walls 72, 83, 88, and 89 not shown with a top most enclosure making up a five sided enclosure over ash hoppers 67, and outlet means 65, 66 Particular to this invention is the chambers enclosure housed within this steel structure and created by dividing walls 74, and 77 that are situated on each side of filter media 75 installed over cage 76 that provides a supporting substrate fixture for the filter media yet, filter media can be constructed of self supporting materials such as ceramics or porous metal not requiring a support structure. For the purpose of this illustration a cloth media is used for enclosure around the filter media.

Waste gas enters nozzle 68 and passes through dampers 70, and 71 when open and is terminated by said dampers when closed. Precoat cycle air passes through nozzles 73 located on the front and back of each filter medial chamber created by said walls and upper dampers 80 and 81 and lower dampers 70, and 71. Dampers 70, 71, 80, 81 are operated by motors 69 and 79 respectively which are geared to close dampers during operating, cleaning and precoating cycles as previously described. Once treated emission gas moves into manifold exhaust chamber made up by side walls 72, and 83 to exit the housing chamber through nozzle 82 through an attached ductwork transport system (not shown here) to a emission stack.

Figure 4:
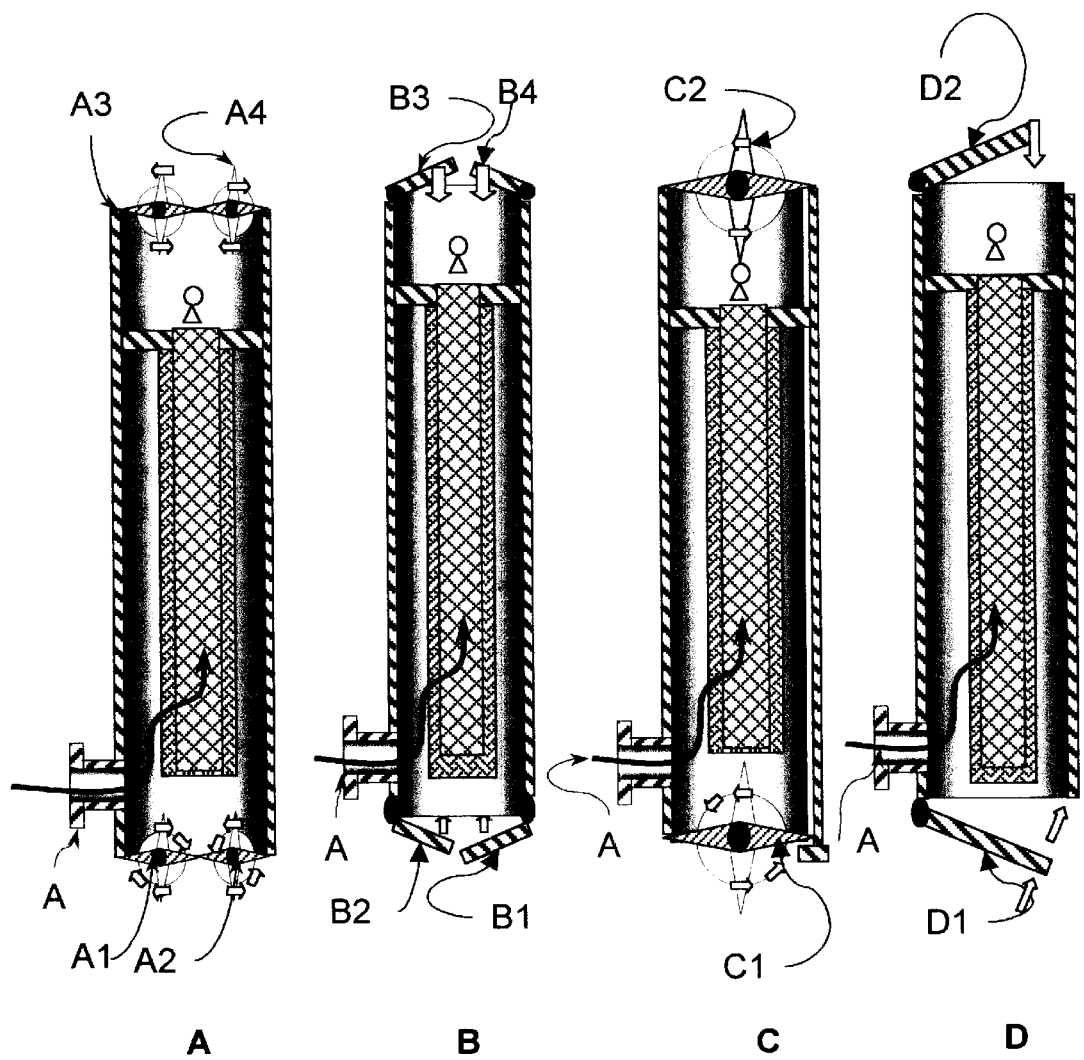
FIG. 4 indicates three other methods to accomplish chamber closures to provide isolation of the chambers for inlet and outlet. 4A is a dual dampers A1, A2, A3 and A4, arranged to rotate around a central axis, 4B is also a dual damper B1, B2, B3, and B4 hinged on one end to rotate to closure to isolate the chamber around the filters. 4C is a single damper arrangement hinged on one end and rotates to closure around the filter chamber.

FIG. 4 Illustrates a simplified chamber with four methods of enclosure. FIG. A is a reverse acting dampers arrangement illustrated in FIGS. 1, 2, and 3. To accomplish chamber closures and provide isolation of the chambers on the inlet and outlet sides A1, and A2 act together to close or open. Dampers A3 and A4, also act together to provide closure or a opening in the chamber device. FIG. B is also a dual damper arrangement having hinged dampers to rotate around a central axis. B1–B4 rotate for opening or closure. FIG. C is a single damper similar to A in that it rotates dampers C1 or C2 within their respective orbit for accomplish closure or opening of the chamber. FIG. D is also a single hinged damper that rotates D1 or D2 on a hinge for opening or closure positions. FIG. A, B, C, and D all have a common precoat air inlet nozzle represented by A.

What is claimed is:

1. A method for continuous emission control of pollutants in a fluid stream using an apparatus comprising two or more parallel chambers enclosing a plurality of filter media in a unitary housing, the chambers having a common manifold inlet section and a common manifold outlet section within the housing, the method comprising:

Providing divider walls within the housing to define the chambers in between the inlet and outlet manifold sections, and providing chamber inlet and outlet isolation dampers between the divider walls of the chambers;

providing a source of reactive sorbent material for coating the plurality of filter media;

terminating a flow of waste gas flow through one of the chambers by closing the chamber outlet isolation damper and cleaning the plurality of filters by providing a discharge opening for ash and spent sorbent through an inlet side of the filters;

closing the chamber inlet isolation damper after the filters are cleaned and ash and spent sorbent are discharged;

supplying a clean purging air from a connection separate from the inlet side of the filters;

supplying a sorbent laden clean air supply having an elevated temperature for purging waste gas and dust while the outlet opening dampers are closed to prevent waste gas from flowing through the cleaned filter media, and depositing a coating of sorbent upon the surface of the plurality of filters;

opening the chamber inlet isolation damper after the coating has been established to expose the coated filter media to waste gas flow while maintaining sorbent supply entrained in clean heated air; and terminating the clean air supply when the inlet dampers are fully opened.

2. The method of claim 1, wherein a continuous treatment path is provided to the waste gas stream in a dry sorbent filter media supported environment, and wherein a path of operation is provided preventing waste gas streams from penetrating a newly cleaned filter media that is uncoated and therefore deficient of sorbent known to improve pollutant removal.

3. The method of claim 1, wherein a clean heated air supply devoid of pollutants and entrained with sorbent known to enhance absorbance and to activate mineral agents prior to reaching the surface of a newly cleaned filter media in order to maximize pollution capture rates after waste gas treatment is initiated.

4. The method of claim 3, wherein the sorbent is sodium bicarbonate, activated carbon, or other suitable reactive sorbent material.

5. The method of claim 1, wherein precoating the plurality of filter media is applied without the influence of waste gas to prevent said waste gas and pollutants from passing through the uncoated filter media.

6. The method of claim 1, wherein a reactive sorbent is selected to serve the appropriate application purpose and is applied to a thickness of 1/64 inch.

7. The method of claim 1, wherein multiple chambers using inlet and outlet dampers are used to control a treatment process of the waste gas flow in a dry flue gas pollution control environment, said sorbent supplying stem comprising:

using inlet dampers to prevent waste gas from mixing with clean heated air and sorbent that is contacting filter surfaces prior to waste gas introduction.

8. The method of claim 7, further comprising using outlet dampers to prevent waste gas from passing through cleaned filter media after a cleaning cycle is completed.

9. An apparatus for continuous emission control of pollutants, comprising two or more parallel chambers enclosing a plurality of filter media in a unitary bag house, the chambers having a common manifold inlet section and a common manifold outlet section;

divider walls within the bag house to define the chambers in between the inlet and outlet manifold sections;

chamber inlet isolation dampers at a downstream side of the plurality of filter media and between the divider walls of the chambers;

chamber outlet isolation dampers at a downstream side of the plurality of filter media and between the divider walls of the chambers;

a source of reactive sorbent material in communication with each chamber for coating the plurality of filter media;

the common manifold sections located within the bag house and outside of the chambers defined by divider walls and dampers.

* * * * *